United States Patent
Aoki et al.

[11] Patent Number: 5,374,341
[45] Date of Patent: Dec. 20, 1994

[54] WATER ELECTROLYZER

[75] Inventors: Kazuaki Aoki; Tomio Tadokoro; Shozo Miyazawa, all of Suzaka, Japan

[73] Assignee: Techno Excel Kabushiki Kaisha, Suzaka, Japan

[21] Appl. No.: 84,199

[22] PCT Filed: Nov. 17, 1992

[86] PCT No.: PCT/JP92/01503
§ 371 Date: Jul. 9, 1993
§ 102(e) Date: Jul. 9, 1993

[87] PCT Pub. No.: WO93/10051
PCT Pub. Date: May 27, 1993

[30] Foreign Application Priority Data
Nov. 22, 1991 [JP] Japan .................. 3-334077
Apr. 13, 1992 [JP] Japan .................. 4-119695

[51] Int. Cl.[5] .................. C25B 9/00; C25B 15/02
[52] U.S. Cl. .................. 204/229
[58] Field of Search .................. 204/229

[56] References Cited
U.S. PATENT DOCUMENTS

| | | | |
|---|---|---|---|
| 4,533,451 | 8/1985 | Kumazawa | 204/229 |
| 4,946,574 | 8/1990 | Lin | 204/229 |
| 5,051,161 | 9/1991 | Yamaguchi et al. | 204/229 |

FOREIGN PATENT DOCUMENTS

| | | | |
|---|---|---|---|
| 6020073 | 3/1978 | Japan . | |
| 99790 | 7/1980 | Japan . | |
| 86494 | 6/1985 | Japan . | |
| 3134680 | 6/1988 | Japan | 204/229 |
| 1099686 | 4/1989 | Japan | 204/229 |

*Primary Examiner*—Donald R. Valentine

[57] ABSTRACT

In the water electrolyzer, an electrolyzing section has electrodes for electrolyzing raw water. The water pressure sensor detects pressure of raw water introduced into the electrolyzing section. A driver circuit adjusts electric power supplied to the electrodes. A microprocessor controls the driver circuit to adjust electric power supplied to the electrodes on the basis of water pressure detected by the water pressure sensor so as to maintain the pH value of the electrolyzed water in a prescribed range. With this structure, the pH value of the electrolyzed water can be maintained in the prescribed range without reference to quantity of water in the electrolyzing section.

12 Claims, 4 Drawing Sheets

FIG. 4
| Q \ pH | 7.5 | 8.0 | 8.5 | 9.0 | 9.5 |
|---|---|---|---|---|---|
| 2.0 | 1/9 | 1/6 | 1/4 | 7/8 | 4/1 |
| 2.5 | 1/9 | 1/5 | 3/7 | 2/1 | 14/1 |
| 3.0 | 1/9 | 1/5 | 3/7 | 2/1 | C |
| 3.5 | 1/6 | 1/4 | 1/2 | 7/5 | C |
| 4.0 | 1/6 | 2/5 | 6/9 | 7/3 | C |
| 4.5 | 1/5 | 2/5 | 7/8 | 5/1 | C |
| 5.0 | 1/5 | 3/7 | 8/7 | C | C |
| 5.5 | 1/5 | 3/7 | 3/2 | C | C |
| 6.0 | 1/5 | 1/2 | 2/1 | C | C |
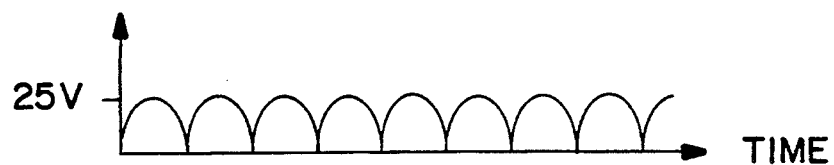
FIG. 5(a)
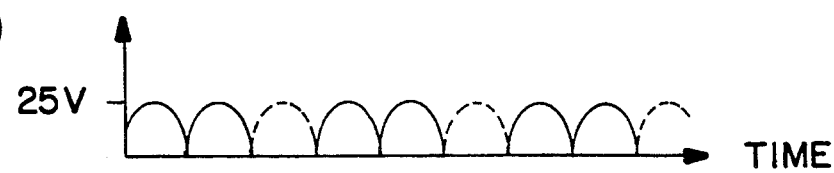
FIG. 5(b)
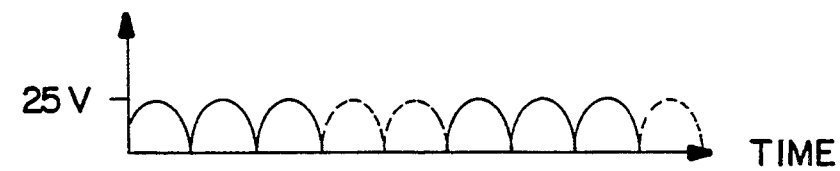
FIG. 5(c)

WATER ELECTROLYZER

FIELD OF TECHNOLOGY

The present invention relates to a water electrolyzer, more precisely relates to a water electrolyzer, which electrolyzes raw water in an electrolyzing section to alkali water and acid water by supplying electric power to electrodes in the electrolyzing section.

BACKGROUND OF TECHNOLOGY

A conventional water electrolyzer, which electrolyzes raw water in an electrolyzing section to alkali water and acid water by supplying electric power to electrodes in the electrolyzing section, has been known. An example is disclosed in Japanese Patent Publication No. 60-20073. The water electrolyzer disclosed in the Japanese Patent has an electrolyzing section whose inner space is divided into a cathode chamber and an anode chamber by a porous partition. There is provided an electrode in each chamber so as to electrolyze raw water. Alkali water is produced in the cathode chamber; acid water is produced in the anode chamber. The proper pH value of alkali water for drinking is 8.5–9.5. In the case of less than pH 8.5, electrolyzed water is almost the same as raw water. On the other hand, in case of more than pH 10.0, it is harmful for human bodies to drink. Therefore, in the conventional water electrolyzer, fixed electric power based on the capacity, etc. of the electrolyzing section is supplied to the electrodes to maintain the pH value of the alkali water between 8.5–9.5 pH.

However, the conventional method of maintaining the pH value has the following disadvantage.

Fixed electric power supplied to the electrodes to maintain the pH value in the prescribed range is defined under the condition that the electrolyzing section is filled with raw water. If the electrolyzing section is not filled with raw water and the fixed electric power is supplied to the electrodes, the electrlyzing capability is too high and the pH value will be in the harmful range: greater than 9.5.

SUMMARY OF THE INVENTION

An object of the present invention is to provide a water electrolyzer, which is capable of maintaining the pH value of electrolyzed water in a predetermined range without reference to the quantity of water in the electrolyzing section.

To achieve the object, the water electrolyzer has the following structure.

In a first basic structure, an electrolyzing section has electrodes for electrolyzing raw water to alkali water and acid water. Detecting means detects pressure of raw water introduced into the electrolyzing section. Adjusting means adjusts electric power supplied to the electrodes. Control means for controlling the adjusting means to adjust electric power supplied to the electrodes on the basis of water pressure detected by the detecting means so as to maintain the pH value of the alkali water or the acid water in the prescribed range.

In a second basic structure, an electrolyzing section has electrodes for electrolyzing raw water to alkali water and acid water. Detecting means detects the pressure of raw water introduced into the electrolyzing section. A rectifier circuit rectifies AC voltage supplied from an electric power source. A driver circuit inputs DC voltage rectified by the rectifier circuit to the electrodes. Memory means stores input patterns of the DC voltage to the electrodes on the basis of the pressure of raw water introduced into the electrolyzing section so as to maintain the pH value of the alkali water or acid water. Control means receives the pressure of raw water introduced into the electrolyzing section from the detecting means, reads the input pattern of the DC voltage out from the memory means so as to maintain pH value of the alkali water or acid water, and inputs the DC voltage to the electrodes by the driver circuit on the basis of the input pattern read out.

In the first basic structure, the control means controls the adjusting means to adjust electric power supplied to the electrodes on the basis of water pressure detected by the detecting means. Therefore, the pH value of the alkali water or the acid water can be maintained in the prescribed range without reference to quantity of water in the electrolyzing section.

In the second basic structure, the control means detects the pressure of raw water introduced into the electrolyzing section with the detecting means, reads the input pattern of the DC voltage out from the memory means so as to maintain the pH value of the alkali water or acid water, and inputs the DC voltage to the electrodes by the driver circuit on the basis of the input pattern read out. Therefore, the pH value of the alkali water or the acid water can be maintained in the prescribed range without reference to the quantity of water in the electrolyzing section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a data table showing voltage input patterns for maintaining the pH value in the second embodiment; and FIG. 5 $(a)$–$(c)$ are graphs showing voltage input patterns in the second embodiment.

DETAILED DESCRIPTION OF THE PREFERRED EMBODIMENTS

The preferred embodiments of the present invention will now be described in detail with reference to the accompanying drawings.

First Embodiment

A first embodiment will be explained with reference to FIGS. 1 and 2.

Figure 1:
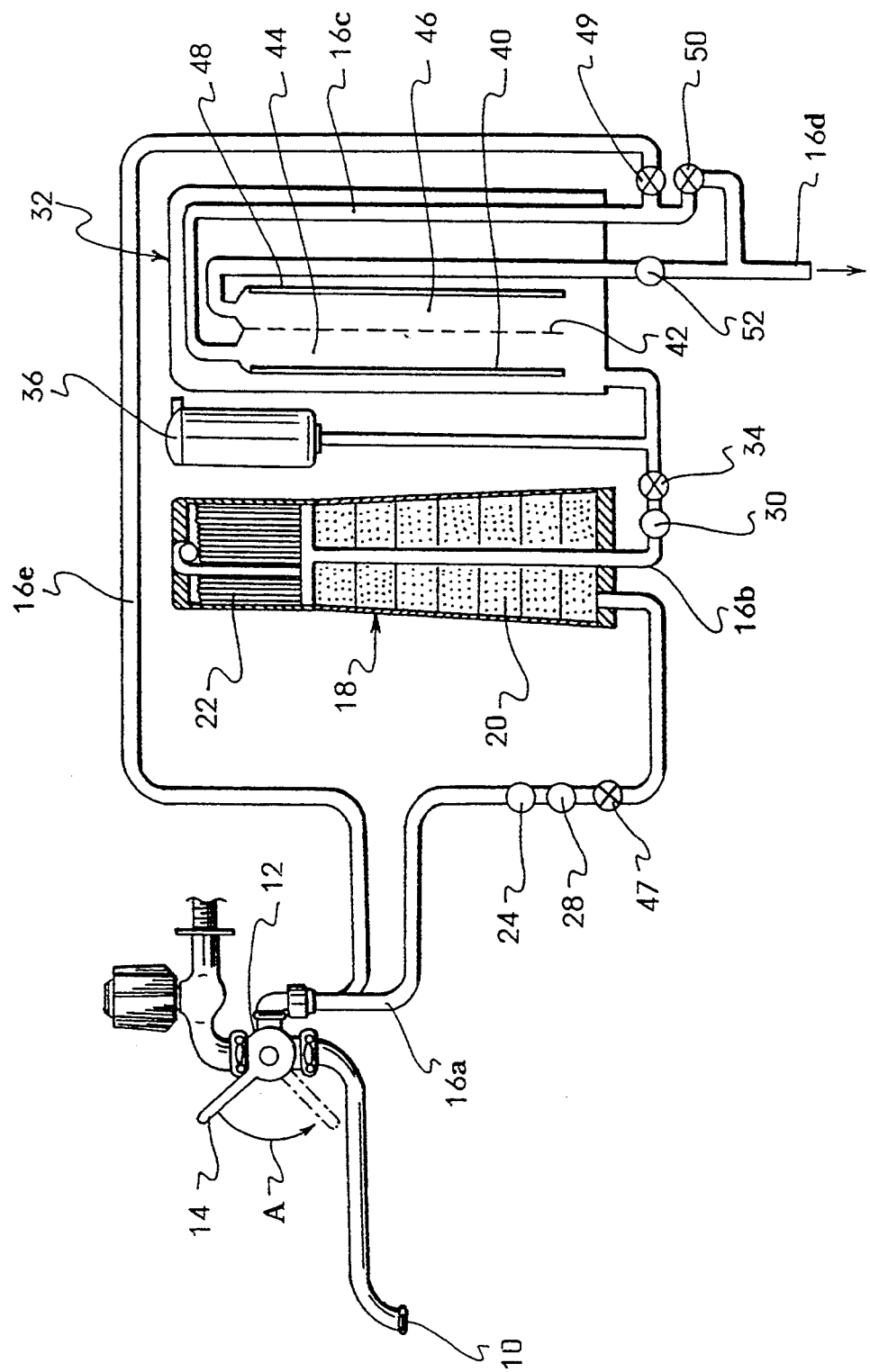
FIG. 1 is an explanation view showing a summary system of a water electrolyzer.
Figure 2:
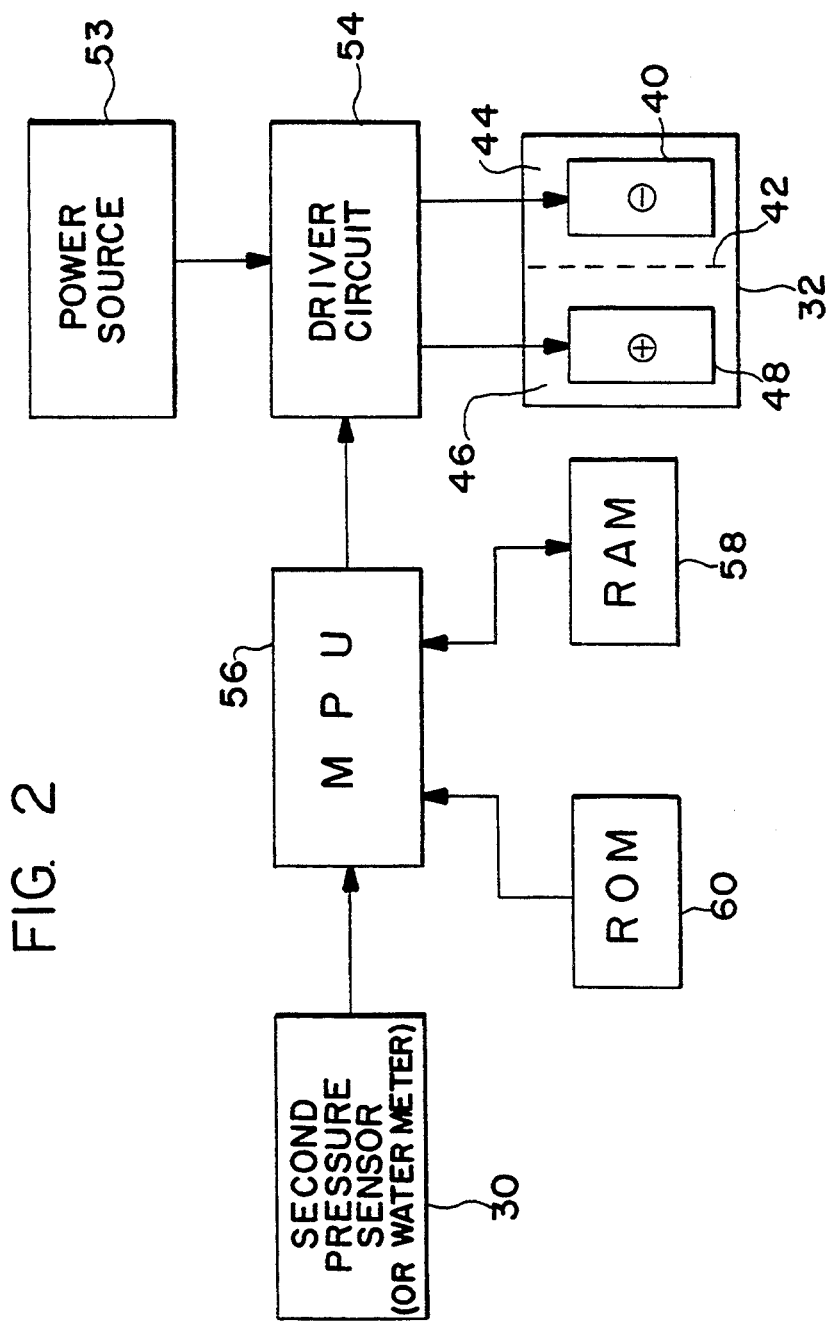
FIG. 2 is a block diagram showing a control system of a first embodiment.

FIG. 1 shows a schematic explanation view showing a summary system of a water electrolyzer of the present embodiment.

In FIG. 1, raw water or alkali water is selectively spouted from a faucet 10. Raw water or alkali water is selected by turning a selection lever 14, which is provided to a selector 12. When the selection lever 14 is turned to a raw water position, raw water, which is supplied via a water supply pipe (not shown), directly spouts from the faucet 10.

On the other hand, when the selection lever 14 is turned, in the direction A, to a alkali water position, raw water, which is supplied via a water supply pipe (not shown), is introduced from the selector 12 to a purifying section 18 via a pipe 16a.

Raw water introduced into the purifying section 18 passes through an activated charcoal cartridge 20 and a hollow fiber filter 22, so that impurities, chlorine, etc. in the raw water are adsorbed and filtered by them, and filtered water is introduced out from a pipe 16b.

A first thermosensor 24 is provided at the pipe 16a. The first thermosensor 24 is, for example, a thermister, and detects water temperature in the pipe 16a so as to prevent water therein from freezing, and prevent hot raw water from flowing into the purifying section 18 and deteriorating activated charcoal in the cartridge 20.

To prevent freezing, for example, if the first thermosensor 24 detects cold raw water, whose temperature is lower than 5° C., AC voltage is inputted to electrodes 40 and 48 in a electrolyzing section 32 so as to warm water therein. On the other hand, if the first thermosensor 24 detects hot raw water, whose temperature is higher than 35° C., a first electromagnetic valve 47 closes the pipe 16a.

A first water pressure sensor 28 is provided to the pipe 16a. The first water pressure sensor 28 detects pressure of the raw water introduced into the pipe 16a. A water meter for detecting flow quantity of the raw water may be used instead of the first water pressure sensor 28.

A mineral adding section 36 add some mineral, e.g., calcium, to purified water in the pipe 16b. In the present embodiment, calcium powders are added thereto.

A second water pressure sensor 30, which is an example of detecting means, is provided to the pipe 16b. The second water pressure sensor 30 detects the pressure of the purified water flowing into the electrolyzing section 32. The second water pressure sensor 30 is also capable of detecting quantity of water electrolyzed in the electrolyzing section 32. Namely, the quantity of the purified water flowing into the electrolyzing section 32 or the quantity of water electrolyzed therein can be known by detecting the pressure of the purified water flowing into the electrolyzing section 32 and calculating the pressure detected. Note that, a water meter for detecting flow quantity of the purified water may be used, as the detecting means, instead of the second water pressure sensor 30. And a water pressure sensor or a water meter as the detecting means may be provided to an outlet part of the electrolyzing section 32 so as to detect total quantity of alkali water and acid water, which must be equal to the quantity of water electrolyzed in the electrolyzing section 32. Moreover, choking degree of the purifying section 18 can be detected by comparing the water pressure in the pipe 16b, which is detected by the second water pressure sensor 30, and the water pressure in the pipe 16a, which is detected by the first water pressure sensor 28.

A regulator 34 is provided to the pipe 16b. The regulator 34 determines maximum pressure or quantity of water flowing in to the electrolyzing section 32, and prevents the purified water, whose pressure or quantity is greater than said maximum value, from flowing thereinto.

The purified water in the electrolyzing section 32 is electrolyzed by the cathode electrode 40 and the anode electrode 48. The cathode 40 and the anode 48 are arranged to face each other, and a porous partition is provided therebetween. By electrolyzing the water, alkali water is produced in a cathode chamber 44 in which the cathode 40 is provided; acid water is produced in an anode chamber 46 in which the anode 48 is provided.

The alkali water produced in the cathode chamber 44 is introduced from the electrolyzing section 32 to the faucet 10 via pipes 16c and 16e and the selector 12.

On the other hand, the acid water produced in the anode chamber 46 is introduced out from the electrolyzing section 32 via a pipe 16d, and used for beauty wash, etc.

The front end of the pipe 16c is connected to the pipe 16d. A second electromagnetic valve 49 is provided at a junction of the pipes 16c and 16e. Furthermore, a third electromagnetic valve 50 is provided on the downstream side of the junction. When the second electromagnetic valve 49 is opened and the third electromagnetic valve 50 is closed, the alkali water is introduced to the faucet 10 via the pipe 16e.

Note that, when the second electromagnetic valve 49 is closed and the third electromagnetic valve 50 is opened, the alkali water is discharged via the pipe 16d. For example, to discharge leftover water in the electrolyzing section 32 when the water electrolyzer is reused after a long time stoppage, or to mix the alkali water and the acid water, the valves are controlled as described above.

There is provided an adjusting screw 52 for adjusting the flow quantity of the acid water discharged at the midway of the pipe 16d. When the alkali water and the acid water is mixed, the quantity of the acid water can be adjusted by the adjusting screw 52.

Successively, a control system for adjusting the pH value will be explained with reference to FIG. 2.

A driver circuit 54, which is an example of adjusting means, inputs voltage from a power source 53 to the electrodes 40 and 48. To electrolyze water, the driver-circuit 54 inputs DC voltage, which is rectified in the power source 53, to the cathode 40 and the anode 48. The driver circuit 54 is controlled by a microprocessor, described later, to adjust electric power or voltage, which will be inputted to the cathode 40 and the anode 48. The driver circuit 54, as the adjusting means, may adjust current instead of voltage. Furthermore, the driver circuit 54 is capable of inputting AC voltage from the power source 53 to the electrodes 40 and 48.

A microprocessor (MPU) 56, which is an example of control means, controls the driver circuit 54 to adjust DC voltage, which is inputted to the cathode 40 and the anode 48, on the basis of water pressure detected by the second water pressure sensor 30 so as to maintain the pH value of the alkali water in a predetermined range (in the present embodiment, the range is pH 8.5–9.5). The relationship between the water pressure and the input voltage is dependent on the capacity of the chambers 44 and 46, etc., and can be determined by experiments. The MPU 56 controls the first electromagnetic valve 26, which works on the basis of the water temperature detected by the first thermosensor 24; judges the choking degree of the purifying section 18 on the basis of the water pressure detected by the first water pressure sensor 28 and the second water pressure sensor 30; controls the second electromagnetic valve 49 and the third electromagnetic valve 50, which works on the basis of user's command, etc.; and inputs AC voltage to the electrodes 40 and 48 in the electrolyzing section 32, by the driver circuit 54, to raise the water temperature therein when the first thermosensor 24 detects cold water, whose temperature is lower than 5° C.

A RAM 58 temporarily stores the water pressure detected by the first water pressure sensor 28 and the second water pressure sensor 30, the water temperature detected by the first thermosensor 24, user's commands, etc.

A ROM 60 stores an operating system of the MPU 56, control programs for maintaining the pH value of the alkali water in the predetermined range, and control data including the data table of the relationship between the water pressure detected by the second water pressure sensor 30 and the voltage inputted to the electrodes 40 and 48.

Next, the action for maintaining the pH value in the predetermined range will be explained.

First, when the water flow quantity in the pipe 16b is small, the MPU 56 reads the data table stored in the ROM 60 to determine the voltage, which will be inputted to the cathode 40 and the anode 48 by the driver circuit 54, relating to the water pressure detected by the second water pressure sensor 30, then inputs the voltage determined thereto. On the other hand, when the water pressure in the pipe 16b becomes greater than the maximum pressure (or flow quantity) defined by the regulator 34, the regulator 34 stops the water flow to maintain the water pressure at the maximum value. Therefore, while the maximum water pressure is detected, fixed voltage based on the data table is inputted to the cathode 40 and the anode 48, so that the pH value of the alkali water can be maintained in the predetermined range.

Second Embodiment

A second embodiment will be explained with reference to FIGS. 3–5 (a), (b) and (c). Note that, elements, which have been shown in the First Embodiment, and are assigned the same numerals shown in FIGS. 1 and 2, are not explained.

The structure of the water electrolyzer of the Second Embodiment are the same as that of the First Embodiment shown in FIG. 1; a control system for maintaining the pH value is different therefrom.

Figure 3:
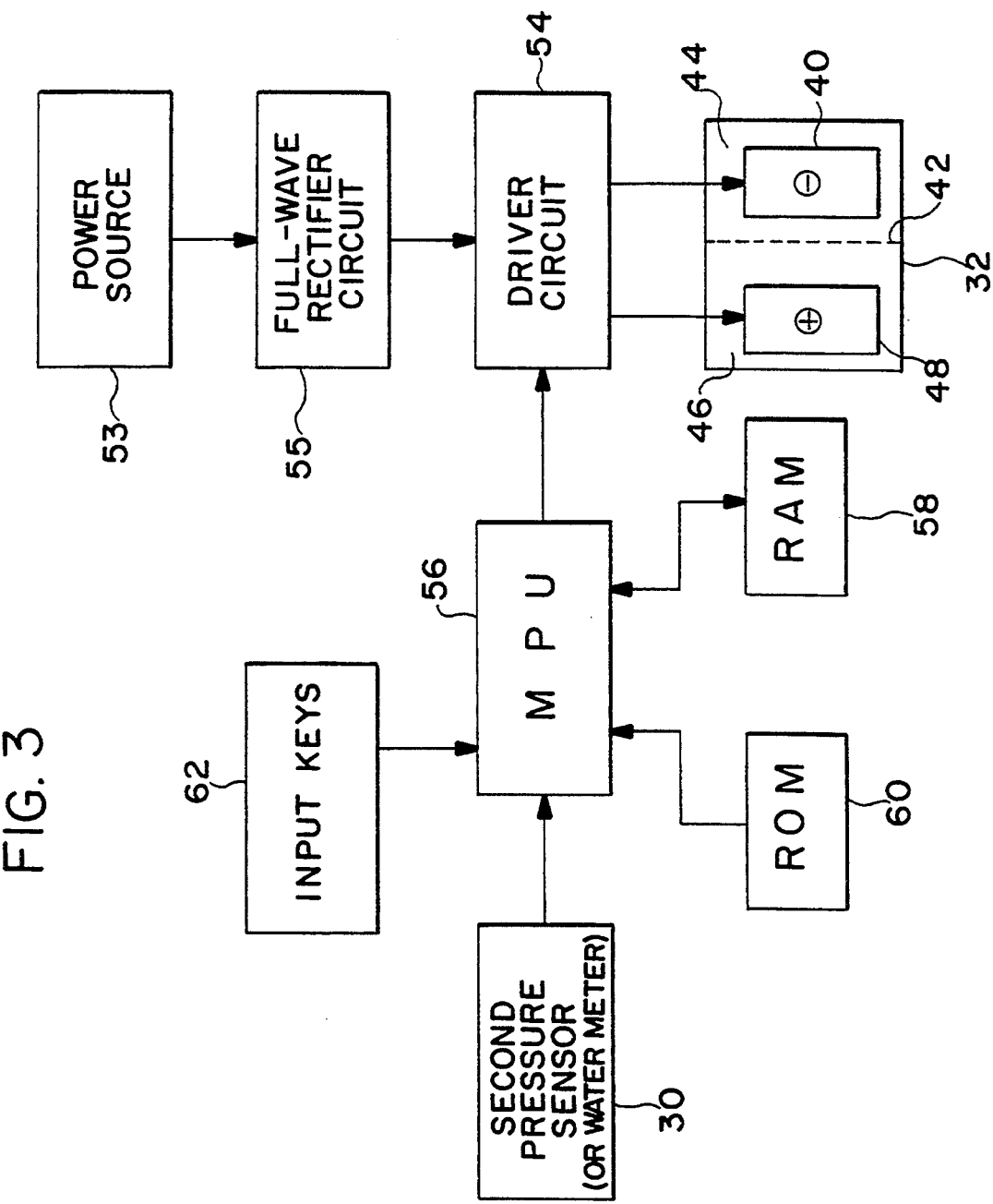
FIG. 3 is a block diagram showing a control system of a second embodiment.

FIG. 3 is a block diagram of the control system for maintaining the pH value of the water electrolyzed according to the second embodiment.

A full-wave rectifier circuit 55, which is an example of a rectifier circuit, rectifies AC voltage from the power source 53 to generate DC voltage, e.g., DC 25 V. The driver circuit 54 inputs the DC voltage rectified by the full-wave rectifier circuit 55 to the electrodes 40 and 48 (normally, the cathode 40 and the anode 48).

The microprocessor (MPU), as control means, detects the water flow quantity through the electrolyzing section 32 by the second water pressure sensor 30, which is an example of detecting means; reads an inputting pattern of DC voltage, which is inputted to the electrodes 40 and 48 and corresponds to present water quantity detected by the second water pressure sensor 30, out from memory means, which will be described later; and controls the driver circuit 54 to input the DC voltage rectified to the electrodes 40 and 48 according to the inputting pattern read out so as to maintain the pH value of the water electrolyzed in the predetermined range. Note that, the inputting pattern of the voltage, which is inputted to the electrodes 40 and 48, is a combination of inputting DC half-waves (ON) and non-inputting DC half-waves (OFF).

RAM 58 temporarily stores the water pressure detected by the second water pressure sensor 30, the water quantity calculated on the basis of the water pressure by the MPU 56, integrated water quantity, user's commands, etc.

ROM 60, which is an example of memory means, stores the table data for maintaining the pH value of the alkali water in the predetermined range, operating system of the MPU 56, control data, etc.

Note that, secondary memories, e.g., an IC card, may be used as memory means instead of the ROM 60.

Input keys 62 are capable of inputting the pH value or the pH value range of the alkali water to the MPU 56. Various types of input means can be used as the input keys 62.

Next, the table data for maintaining the pH value of the alkali water in the predetermined range will be explained with reference to FIGS. 4 and 5.

In FIG. 4, object pH values (or median values of predetermined ranges) of the alkali water, which will be inputted by the input keys 62, are shown in the uppermost row. On the other hand, values of the water quantity Q (unit: l/min.), which are detected by the second water pressure sensor 30, are shown in the left-most column.

Preferable input patterns relating to the pH value and the water quantity Q are shown in FIG. 4. The input patterns are shown by a letter "C" and numerals "M/N" (M and N are natural numbers).

In case of the input pattern C, the driver circuit 54 continuously inputs half-wave pulses, which are rectified by the full-wave rectifier circuit 55, to the electrodes 40 and 48. This input pattern is shown in FIG. 5(a).

On the other hand, in the case that the input pattern is indicated as numerals M/N, the driver circuit 54 continuously inputs half-wave pulses of number M (ON) shown as solid lines, then the driver circuit 54 does not input pulses for a time of half-wave pulses of number N (OFF) shown as dotted lines. For example, the number M is two and the number N is one (M/N=2/1), two half-wave pulses are continuously ON, then one half-wave pulse illustrates the OFF. A graph shown in FIG. 5(b) is case of M/N=2/1: the half-wave pulses ON are shown by solid lines, and the half-wave pulses OFF are shown by dotted lines. Another example of the input pattern is explained. Input pattern shown in FIG. 5(c) is the case of M/N=3/2: three half-wave pulses ON are shown by solid lines, and two half-wave pulses OFF are shown by dotted lines.

The table data have been previously determined by experiments, and they are defined under conditions of electric power supplied by the power source 53, capacity of the electrolyzing section 32, etc.

The MPU 56 maintains the pH value of the alkali water by the steps of detecting the flow water quantity Q through the electrolyzing section 32 by the second water pressure sensor 30; reading proper input patterns out from the data table in the ROM 60; and controlling the driver circuit 54 to input half-wave pulses to the electrodes 40 and 48 on the basis of the input pattern read out.

Note also that, in the Second Embodiment, a water meter may be used, as detecting means, instead of the water pressure sensor. And the regulator 34 defines the maximum value of the water pressure or the flow water quantity in the electrolyzing section 32.

Preferred embodiments of the present invention have been described in detail, but the invention is not limited to the above described embodiments, and modifications, which are not deviated from the spirit of the invention, will be included within the scope of the following claims.

We claim:

1. A water electrolyzer comprising:
an electrolyzing section having electrodes for electrolyzing raw water to alkali water and acid water;
detecting means for detecting pressure of raw water introduced into said electrolyzing section;
adjusting means for adjusting electric power supplied to said electrodes; and
control means for controlling said adjusting means to adjust electric power supplied to said electrodes on the basis of the water pressure detected by said detecting means so as to maintain pH value of the alkali water in a desired range.

2. The water electrolyzer according to claim 1, further comprising a regulator for defining maximum pressure of said raw water introduced into said electrolyzing section.

3. A water electrolyzer comprising:
an electrolyzing section having electrodes for electrolyzing raw water to alkali water and acid water;
detecting means for detecting pressure of raw water introduced into said electrolyzing section;
a rectifier circuit for rectifying AC voltage supplied from an electric power source;
a driver circuit for inputting DC voltage rectified by said rectifier circuit to said electrodes;
memory means for storing input patterns of the DC voltage to said electrodes on the basis of the pressure of raw water introduced into said electrolyzing section and pre-determined ranges of pH values of the alkali water; and
control means for receiving the pressure of raw water introduced into said electrolyzing section from said detecting means, reading the input pattern of the DC voltage out from said memory means so as to maintain pH value of the alkali water in a desired range corresponding to the pressure of raw water introduced into said electrolyzing section, and inputting the DC voltage to said electrodes by said driver circuit on the basis of the input pattern read out.

4. The water electrolyzer according to claim 3, wherein the input patterns are combined patterns of input and non-input of the DC voltage, which is rectified by said rectifier circuit.

5. The water electrolyzer according to claim 3, wherein said rectifier circuit is a full-wave rectifier circuit.

6. The water electrolyzer according to claim 3, further comprising a regulator for defining maximum pressure of raw water introduced into said electrolyzing section.

7. A water electrolyzer comprising:
an electrolyzing section having electrodes for electrolyzing raw water to alkali water and acid water;
detecting means for detecting quantity of raw water passing through a raw water delivery pipe and introduced into said electrolyzing section;
adjusting means for adjusting electric power supplied to said electrodes; and
control means for controlling said adjusting means to adjust electric power supplied to said electrodes on the basis of the quantity of water detected by said detecting means so as to maintain pH value of the alkali water in a desired range.

8. The water electrolyzer according to claim 7, further comprising a regulator for defining maximum pressure of raw water introduced into said electrolyzing section.

9. A water electrolyzer comprising:
an electrolyzing section having electrodes for electrolyzing raw water to alkali water and acid water;
detecting means for detecting a quantity of raw water introduced into said electrolyzing section;
a rectifier circuit for rectifying AC voltage supplied from an electric power source;
a driver circuit for inputting DC voltage rectified by said rectifier circuit to said electrodes;
memory means for storing input patterns of the DC voltage to said electrodes on the basis of the quantity of raw water introduced into said electrolyzing section and pre-determined ranges of pH values of the alkali water; and
control means for receiving the quantity of raw water introduced into said electrolyzing section from said detecting means, reading the input pattern of the DC voltage out from said memory means so as to maintain pH value of the alkali water in a desired range corresponding to the quantity of raw water introduced into said electrolyzing section, and inputting the DC voltage to said electrodes by said driver circuit on the basis of the input pattern read out.

10. The water electrolyzer according to claim 9, wherein the input patterns are combined patterns of input and non-input of the DC voltage, which is rectified by said rectifier circuit.

11. The water electrolyzer according to claim 9, wherein said rectifier circuit is a full-wave rectifier circuit.

12. The water electrolyzer according to claim 9, further comprising a regulator for defining maximum pressure of raw water introduced into said electrolyzing section.

* * * * *